May 8, 1962     F. W. BALL     3,033,302

BELT DRIVEN ACCESSORY MOUNTING

Filed Jan. 18, 1960     2 Sheets-Sheet 1

INVENTOR.
Frank W. Ball
BY
S. C. Thorpe
ATTORNEY.

May 8, 1962  F. W. BALL  3,033,302
BELT DRIVEN ACCESSORY MOUNTING
Filed Jan. 18, 1960  2 Sheets-Sheet 2
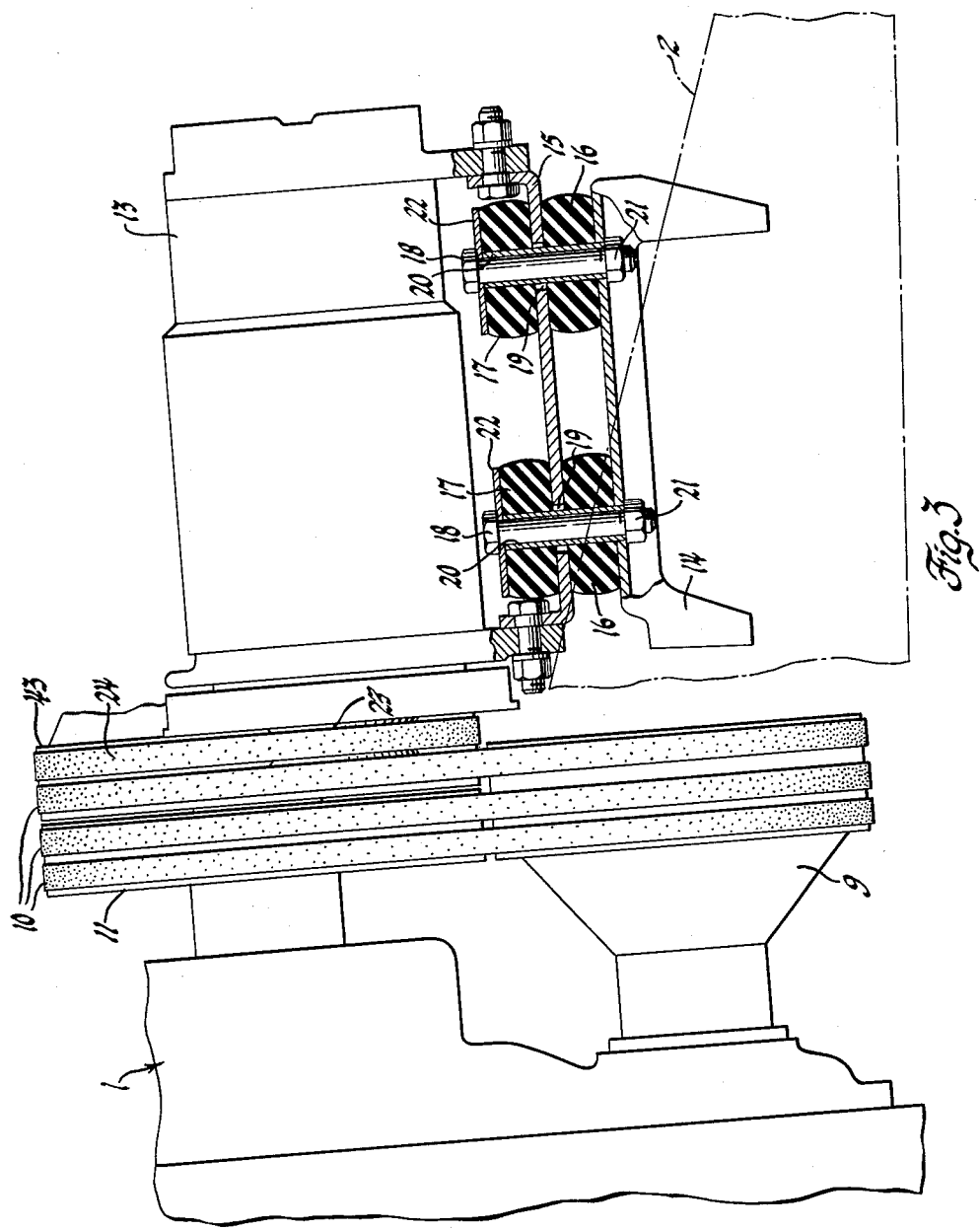
INVENTOR.
Frank W. Ball
BY
S. C. Thorpe
ATTORNEY

United States Patent Office 3,033,302
Patented May 8, 1962

3,033,302
BELT DRIVEN ACCESSORY MOUNTING
Frank W. Ball, Lansing, Mich., assignor to General Motors Corporation, Detroit, Mich., a corporation of Delaware
Filed Jan. 18, 1960, Ser. No. 3,005
1 Claim. (Cl. 180—64)

This invention relates to belt driven accessories for automotive vehicle engines and the like, and particularly to mountings for such accessories.

With the increasing trend in modern automotive vehicle design toward lower vehicle profiles, coupled with an increasing number of engine powered accessories, a serious problem has developed in finding sufficient room under the vehicle hood for those accessories which are to be belt driven from the engine. Conventionally, such accessories have been mounted by brackets directly to the engine which has the advantage of easily maintaining belt tensions. In the case of the electrical generator, it is generally pivoted to its bracket on the engine and a strut extending between the generator and a fixed part of the engine cooperates with the pivotal mounting to adjustably maintain the proper belt tension.

In accordance with this invention the generator or other such belt driven accessory is mounted on the vehicle frame instead of on the engine, thereby relieving the crowded condition which normally results from supporting such accessory units directly on the engine. In order to accommodate torque reaction and vibrating movements of the engine relative to the frame on its resilient mountings the generator unit is so mounted on the frame to allow for movement relative thereto in the same plane as the engine movement, and all such movement of the engine in this plane is transmitted to the generator by a strut which maintains the belt tension constant. For such purpose, the strut is preferably located in the plane of the generator drive belt, and coincidental with a line intersecting the axes of the belt driving and driven sheaves. Also, the strut connections to the engine and generator are cushioned in rubber to damp relative vibrating movements between them.

A better understanding of the invention will be had from the following description, having reference to the drawings wherein:

FIGURE 3 is a side view of the installation showing the generator mounting on the vehicle frame, with parts broken away and in section along line 3—3 of FIGURE 1.

Figure 1:
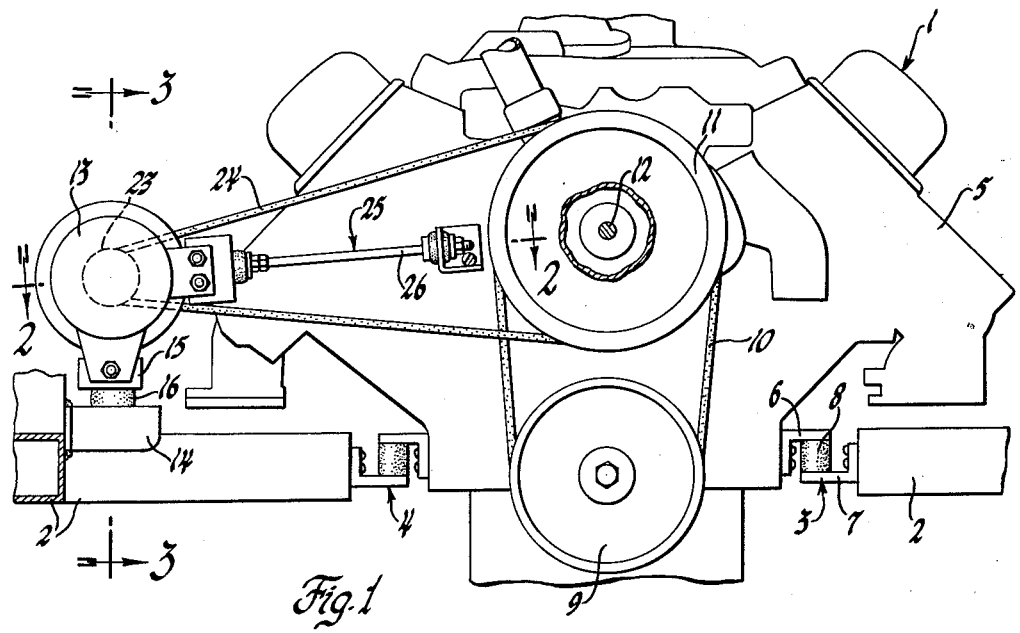
FIGURE 1 is an end view of an automotive vehicle engine and generator drive installation embodying the principals of the invention.

A typical automotive vehicle engine 1 is shown connected to its vehicle supporting means or frame 2 through suitable resilient mounting means 3 and 4 on opposite sides of the engine cylinder block 5. Each of these engine mounts is illustrated as comprising metal brackets 6 and 7 fixed to the engine and frame, respectively, with resilient means in the form of a rubber pad 8 between the free ends of the brackets. Such resilient mounting of the engine is conventional and allows a limited degree of engine movement relative to the vehicle frame during vehicle operation as the result of engine vibration, torque impulses, inertia forces, etc. Shown also is the usual crankshaft driven pulley 9 at one end of the engine, over which runs one or more belts 10 driving a second pulley wheel 11 on the shaft 12 of the engine water pump.

At 13 is shown a typical engine driven accessory in the form of an electrical generator. Whereas it is conventional practice to mount such a generator on a bracket fixed to the cylinder block 5 or other rigid portion of the engine, in accordance with the invention the generator 13 is instead supported independently of the engine on a portion of the frame 2 to one side of the engine. Such generator mounting, as best shown in FIGURE 3, comprises a rigid frame extending bracket 14 which underlies the generator. A channel shaped plate 15 rigidly bolted at opposite ends to the generator housing overlies this frame bracket 14 and is resiliently spaced therefrom by a pair of resilient rubber biscuits 16. A like pair of biscuits 17 are located on the opposite side of the channel 15, and all four biscuits are held under compression by bolts 18 which extend through clearance holes 19 in the channel 15 and through apertures aligned therewith in the bracket 14. Rigid tubular members or spacers 20 surround the bolts 18 and limit the compression of the biscuits when the bolts are drawn up by nuts 21. Flat washers 22 overlie the upper ends of the spacer tubes and the upper biscuits 17 to distribute the compressive loading on the biscuits. By reason of the resilience of the biscuits and the clearance holes 19 for the spacer tubes in the channel 15 a desired amount of relative pivotal movement is afforded the generator on the vehicle frame.

Figure 2:
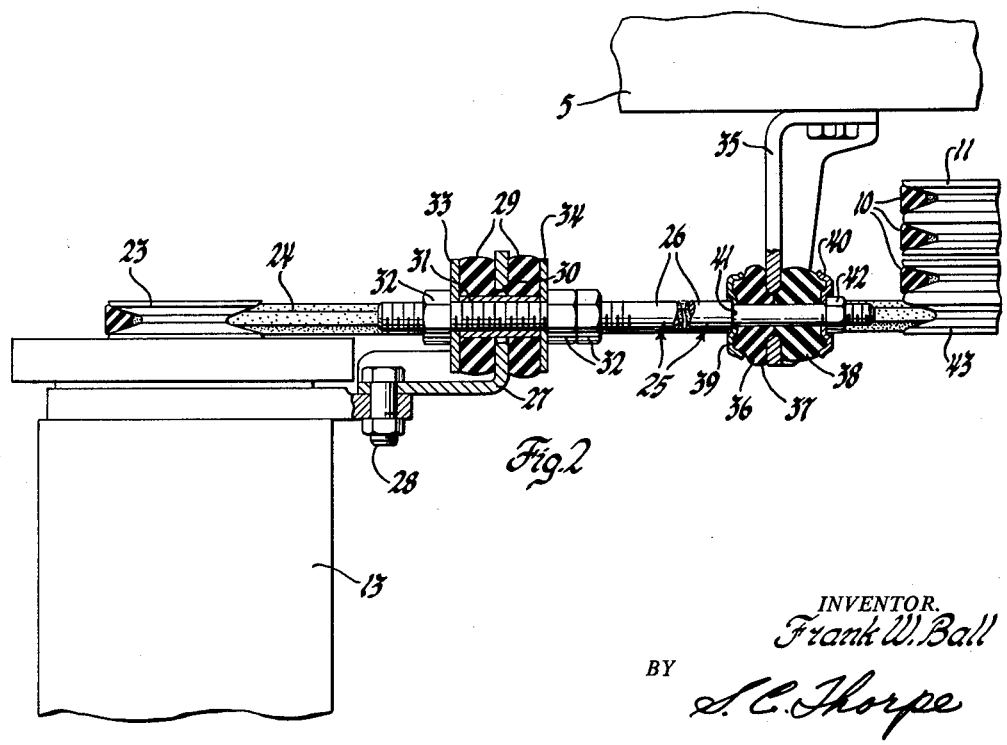
FIGURE 2 is a partial plan view showing the belt drive and generator bracing strut means, with parts broken away and in section along the line 2—2 of FIGURE 1.

The generator drive wheel or pulley 23 is connected to the water pump pulley 11 by a flexible belt 24, and to maintain proper tension constant in this belt 24 during movements of the engine on its mounts 3 and 4 there is provided a strut means 25 which transmits such engine movements to the generator 13. This strut means includes a rigid rod-like member 26 having resilient means pivotally connecting its opposite ends to the engine cylinder block 5 and the generator 13. As best shown in FIGURE 2, the strut connection to the generator comprises a bracket 27 fixed as by bolting at 28 to the generator housing and extending between a pair of resilient members in the form of rubber biscuits 29. The strut rod extends through these biscuits and through an opening 30 in the bracket 27, which opening is made large enough to provide lateral clearance for a rigid tubular element or spacer 31 embracing the strut rod 26. Nuts 32, threaded on the strut rod on opposite ends of the pair of biscuits 29, are provided for adjustably locating the strut rod relative to the generator bracket and for drawing up on the biscuits 29 against the spacer tube 31. Flat washers 33 and 34 overlie the outer ends of the biscuits and the spacer tube 31 to distribute the compression loading of the biscuits, and the spacer tube length is selected to allow sufficient compression of the biscuits when the nuts are drawn up to obtain the desired firmness of thrust transmission between the strut and the generator bracket 27.

A somewhat similar connection is made at the opposite end of the strut rod 26 for anchoring it to the engine cylinder block 5. Shown is a rigid element in the form of a bracket 35 extending from the block and provided with an enlarged aperture 36 through which the strut rod extends. Rubber biscuits 37 and 38 are provided on opposite sides of the bracket 35, and each has axial portions extending through the aperture 36 to insulate the strut rod from the bracket 35. Washers 39 and 40 embrace the pair of biscuits 37 and 38 on the strut rod between a shoulder 41 on the rod and a nut 42 threaded on the end of the rod.

As best shown in FIGURE 2, the strut rod 26 lies in the plane of the generator drive belt 24, generator drive pulley 23 and the associated sheave 43 of the water pump pulley 11. Also, as best shown in FIGURE 1, the strut has its longitudinal axis substantially coincident with a line intersecting the axes of the pulleys 23 and 11. As thus arranged, all of the reaction of the generator belt 24 is taken by the strut, and the latter maintains a constant center to center distance between the generator and water pump pulley to maintain the belt tension constant. The resilient mounting of the generator on the frame, as described, allows the generator to pivot or otherwise move in accordance with pivotal or lateral movement of the engine in the plane of the generator belt. Also, the resilience in the strut connections to the generator and frame provided by the biscuits 29, 37 and 38 serves to damp relative vibration between them.

It is appreciated that various minor changes in the design and construction of the parts from that described may be made without departing from the spirit and scope of the invention as hereinafter claimed.

I claim:

In an automotive vehicle, a vehicle frame, an engine, engine mounting means secured to the frame and accommodating a limited extent of engine movement in one plane relative to the frame, a belt driving wheel in said plane driven by the engine, an engine driven unit having a driving wheel in said plane, a belt coplanar with and drivably connecting said wheels, and supporting means for said unit, said supporting means including unit mounting means secured to the frame and accommodating movement of the unit in said plane relative to the frame and strut means having its longitudinal axis substantially coincident with a line intersecting the axes of said wheels, said strut means comprising an elongated rigid member and pivotal connections adjacent the respective ends thereof between said elongated member and said unit and engine, one of said connections including a resiliently yieldable member and a rigid element clamping said resiliently yieldable member to said elongated rigid member and to one of said unit and engine.

References Cited in the file of this patent

UNITED STATES PATENTS

| | | |
|---|---|---|
| 1,714,092 | Johnson | May 21, 1929 |
| 2,022,916 | Knapp | Dec. 3, 1935 |
| 2,199,954 | Kelsey | May 7, 1940 |
| 2,392,573 | Brock et al. | Jan. 8, 1946 |
| 2,860,717 | Jedrzykowski et al. | Nov. 18, 1958 |